United States Patent
Numata et al.

(10) Patent No.: US 11,468,159 B2
(45) Date of Patent: Oct. 11, 2022

(54) MEMORY SYSTEM

(71) Applicant: KIOXIA CORPORATION, Tokyo (JP)

(72) Inventors: Kenichi Numata, Kokubunji Tokyo (JP); Sachi Tarui, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 395 days.

(21) Appl. No.: 16/808,186

(22) Filed: Mar. 3, 2020

(65) Prior Publication Data
US 2021/0103653 A1  Apr. 8, 2021

(30) Foreign Application Priority Data
Oct. 4, 2019 (JP) .............................. JP2019-183777

(51) Int. Cl.
G06F 21/44 (2013.01)
H04L 9/08 (2006.01)
G06F 3/06 (2006.01)

(52) U.S. Cl.
CPC ............ G06F 21/44 (2013.01); G06F 3/0622 (2013.01); G06F 3/0658 (2013.01); G06F 3/0679 (2013.01); H04L 9/0869 (2013.01)

(58) Field of Classification Search
CPC ...... G06F 21/44; G06F 3/0622; G06F 3/0658; G06F 3/0679; H04L 9/0869
See application file for complete search history.

(56) References Cited

U.S. PATENT DOCUMENTS

| 8,984,653 | B2* | 3/2015 | John | G06F 21/74 726/26 |
| 8,990,926 | B2* | 3/2015 | Hagiwara | G06F 21/88 726/18 |
| 2013/0024679 | A1 | 1/2013 | Isozaki | |
| 2018/0137285 | A1* | 5/2018 | Yamada | G06F 12/023 |

FOREIGN PATENT DOCUMENTS

JP   2018-81577 A   5/2018

* cited by examiner

Primary Examiner — Hee K Song
(74) Attorney, Agent, or Firm — Kim & Stewart LLP

(57) ABSTRACT

A memory system includes a nonvolatile memory including user areas, a volatile memory, a battery, and a controller configured to, when the volatile memory maintains first information indicating an access to a user area is permitted and a verification value upon startup of the system, determine whether the information is validated by the value, and upon determining that the information is validated, permit an access to the user area and prohibit the access to any other area, and when the volatile memory does not maintain the information and value, or the information is not validated, prohibit an access to any user area, and thereafter, upon receipt of a command and authentication information from the host, permit an access to the user area requested by the command, and generate and store in the volatile memory the information and the value for validating the generated information.

20 Claims, 13 Drawing Sheets

FIG. 4

| UID | Name | Range Start | Range Length | ReadLock Enabled | WriteLock Enabled | Read Locked | Write Locked | Lock OnReset | |
|---|---|---|---|---|---|---|---|---|---|
| 00000802 00000001 | GlobalRange | 0 | 0 | FALSE | FALSE | FALSE | FALSE | [PowerCycle] | ... |
| 00000802 00030001 | Range1 | 0 | 0 | FALSE | FALSE | FALSE | FALSE | [PowerCycle] | ... |
| 00000802 00030002 | Range2 | 0 | 0 | FALSE | FALSE | FALSE | FALSE | [PowerCycle] | ... |
| 00000802 00030003 | Range3 | 0 | 0 | FALSE | FALSE | FALSE | FALSE | [PowerCycle] | ... |

LOCKING TABLE (61)

BEFORE PERFORMING LockOnReset (61A):

| UID | Name | Range Start | Range Length | ReadLock Enabled | WriteLock Enabled | Read Locked | Write Locked | Lock OnReset |
|---|---|---|---|---|---|---|---|---|
| 00000802 00000001 | GlobalRange | 0 | 0 | FALSE | FALSE | FALSE | FALSE | [PowerCycle] |
| 00000802 00030001 | Range1 | 0 | 0 | FALSE | FALSE | FALSE | FALSE | [PowerCycle] |
| 00000802 00030002 | Range2 | 0 | 0 | FALSE | FALSE | FALSE | FALSE | [PowerCycle] |
| 00000802 00030003 | Range3 | 0 | 0 | FALSE | FALSE | FALSE | FALSE | [PowerCycle] |

TRUE IS RESPECTIVELY SET IN ReadLockEnabled, WriteLockEnabled, ReadLock, AND WriteLocked WITHIN EACH ENTRY AFTER PERFORMING LockOnReset (61B):

| UID | Name | Range Start | Range Length | ReadLock Enabled | WriteLock Enabled | Read Locked | Write Locked | Lock OnReset |
|---|---|---|---|---|---|---|---|---|
| 00000802 00000001 | GlobalRange | 0 | 0 | TRUE | TRUE | TRUE | TRUE | [PowerCycle] |
| 00000802 00030001 | Range1 | 0 | 0 | TRUE | TRUE | TRUE | TRUE | [PowerCycle] |
| 00000802 00030002 | Range2 | 0 | 0 | TRUE | TRUE | TRUE | TRUE | [PowerCycle] |
| 00000802 00030003 | Range3 | 0 | 0 | TRUE | TRUE | TRUE | TRUE | [PowerCycle] |

FIG. 6

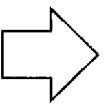

LOCKING TABLE

BEFORE RELEASING LOCK

| UID | Name | Range Start | Range Length | ReadLock Enabled | WriteLock Enabled | Read Locked | Write Locked | Lock OnReset |
|---|---|---|---|---|---|---|---|---|
| 00000802 00000001 | GlobalRange | 0 | 0 | TRUE | TRUE | TRUE | TRUE | [PowerCycle] |
| 00000802 00030001 | Range1 | 0 | 0 | TRUE | TRUE | TRUE | TRUE | [PowerCycle] |
| 00000802 00030002 | Range2 | 0 | 0 | TRUE | TRUE | TRUE | TRUE | [PowerCycle] |
| 00000802 00030003 | Range3 | 0 | 0 | TRUE | TRUE | TRUE | TRUE | [PowerCycle] |

61C

FALSE IS RESPECTIVELY SET IN ReadLocked, AND WriteLocked WITHIN EACH ENTRY CORRESPONDING TO FIRST RANGE

AFTER RELEASING LOCK

| UID | Name | Range Start | Range Length | ReadLock Enabled | WriteLock Enabled | Read Locked | Write Locked | Lock OnReset |
|---|---|---|---|---|---|---|---|---|
| 00000802 00000001 | GlobalRange | 0 | 0 | TRUE | TRUE | TRUE | TRUE | [PowerCycle] |
| 00000802 00030001 | Range1 | 0 | 0 | TRUE | TRUE | FALSE | FALSE | [PowerCycle] |
| 00000802 00030002 | Range2 | 0 | 0 | TRUE | TRUE | TRUE | TRUE | [PowerCycle] |
| 00000802 00030003 | Range3 | 0 | 0 | TRUE | TRUE | TRUE | TRUE | [PowerCycle] |

61D

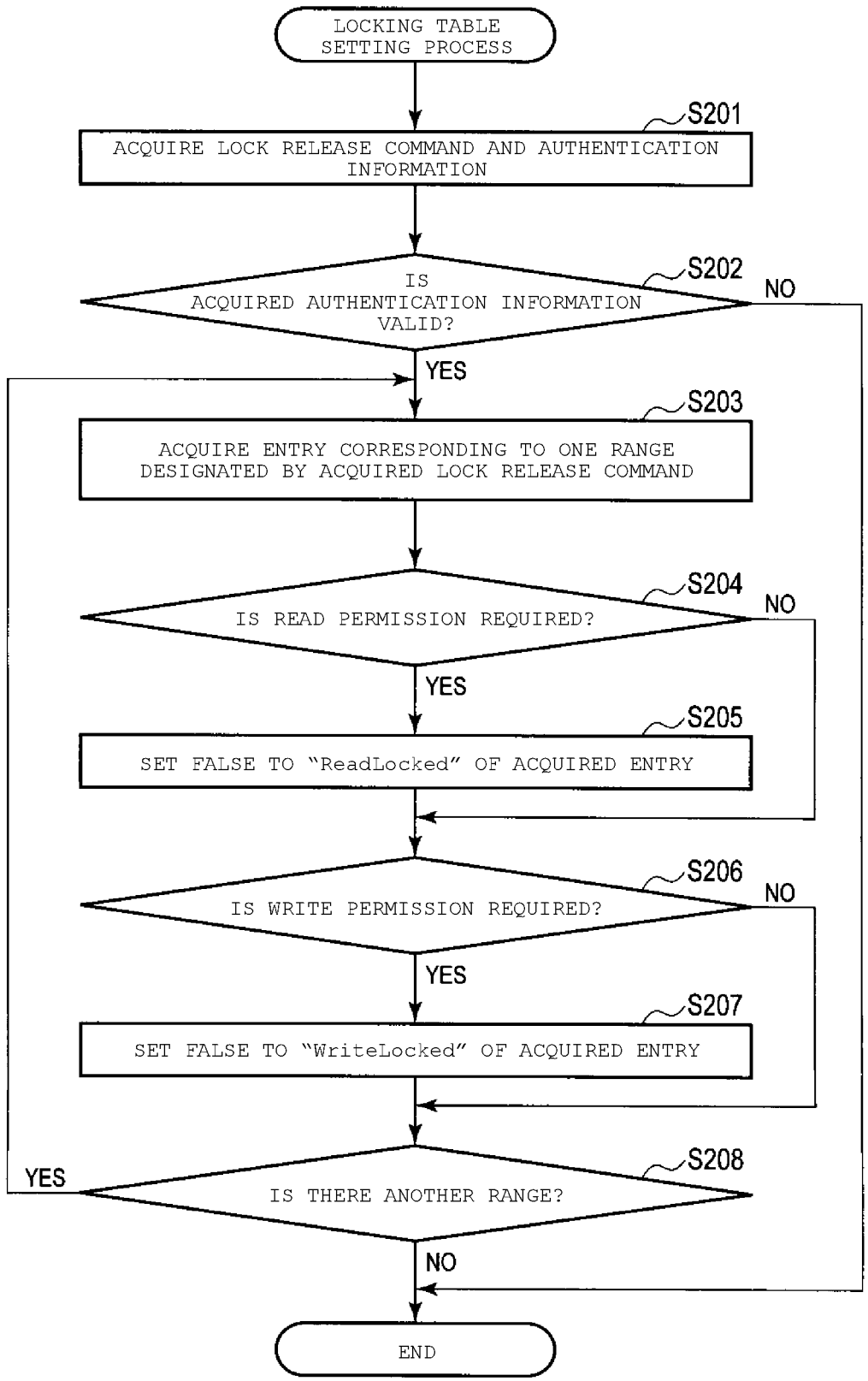

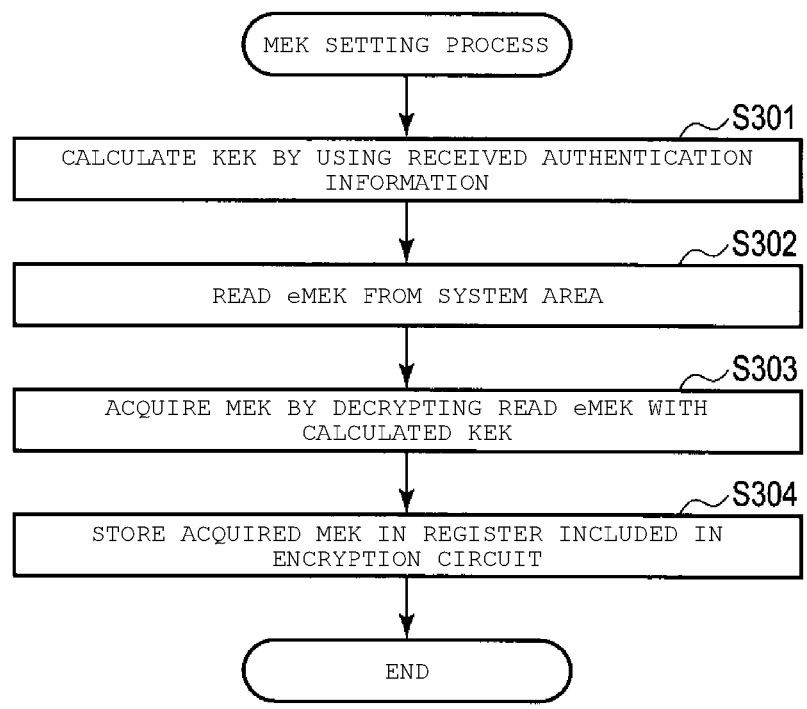

FIG. 14

| UID | Name | Range Start | Range Length | ReadLock Enabled | WriteLock Enabled | Read Locked | Write Locked | Lock OnReset | PLPSecureBoot | ... |
|---|---|---|---|---|---|---|---|---|---|---|
| 00000802 00000001 | GlobalRange | 0 | 0 | FALSE | FALSE | FALSE | FALSE | [PowerCycle] | FALSE | ... |
| 00000802 00030001 | Range1 | 0 | 0 | FALSE | FALSE | FALSE | FALSE | [PowerCycle] | TRUE | ... |
| 00000802 00030002 | Range2 | 0 | 0 | FALSE | FALSE | FALSE | FALSE | [PowerCycle] | TRUE | ... |
| 00000802 00030003 | Range3 | 0 | 0 | FALSE | FALSE | FALSE | FALSE | [PowerCycle] | TRUE | ... |

MEMORY SYSTEM

CROSS-REFERENCE TO RELATED APPLICATION

This application is based upon and claims the benefit of priority from Japanese Patent Application No. 2019-183777, filed Oct. 4, 2019, the entire contents of which are incorporated herein by reference.

FIELD

Embodiments described herein relate generally to a technology of controlling a memory system including a nonvolatile memory.

BACKGROUND

Recently, memory systems including nonvolatile memories have been widely used. As one of the memory systems, a solid state drive (SSD) including a NAND flash memory is known. The memory system such as an SSD executes boot programs such as a boot loader and firmware at the time of startup. The memory system may verify those programs to execute only the programs that are validated. The verification and boot process is called secure boot. The secure boot can prevent an altered program from being executed on the memory system.

DESCRIPTION OF THE DRAWINGS

FIGS. 4-6 each show a diagram illustrating a locking table according to the embodiment.

FIG. 7 is a flowchart of a locking table setting process performed by the memory system.

FIG. 8 is a flowchart a MEK setting process performed by the memory system.

FIG. 14 is a diagram illustrating a locking table according to a modification example of the embodiment.

DETAILED DESCRIPTION

Embodiments provide a memory system that can reduce time necessary for startup.

In general, according to one embodiment, a memory system capable of communicating with a host, includes a nonvolatile memory including a plurality of predetermined user areas, a volatile memory, a battery capable of supplying power to the memory system when power supply from an external power source is interrupted, and a controller configured to, when the volatile memory maintains first information indicating that an access to at least one of the user areas is permitted and a verification value for validating the first information upon startup of the memory system, determine whether or not the first information is validated by the verification value, and upon determining that the first information is validated, permit an access from the host to said at least one of the user areas and prohibit the access to any user area other than said at least one of the user areas, and when the volatile memory does not maintain the first information and the verification value, or the volatile memory maintains the first information and the verification value but the first information is not validated, prohibit an access from the host to any user area, and thereafter, upon receipt of a command to request for an access to a user area and valid authentication information from the host, permit the access to the user area, generate first information indicating that the access to the user area is permitted and a verification value for validating the generated first information, and store the generated first information and verification value in the volatile memory.

Hereinafter, embodiments of the present disclosure will be described with reference to the drawings.

Figure 1:
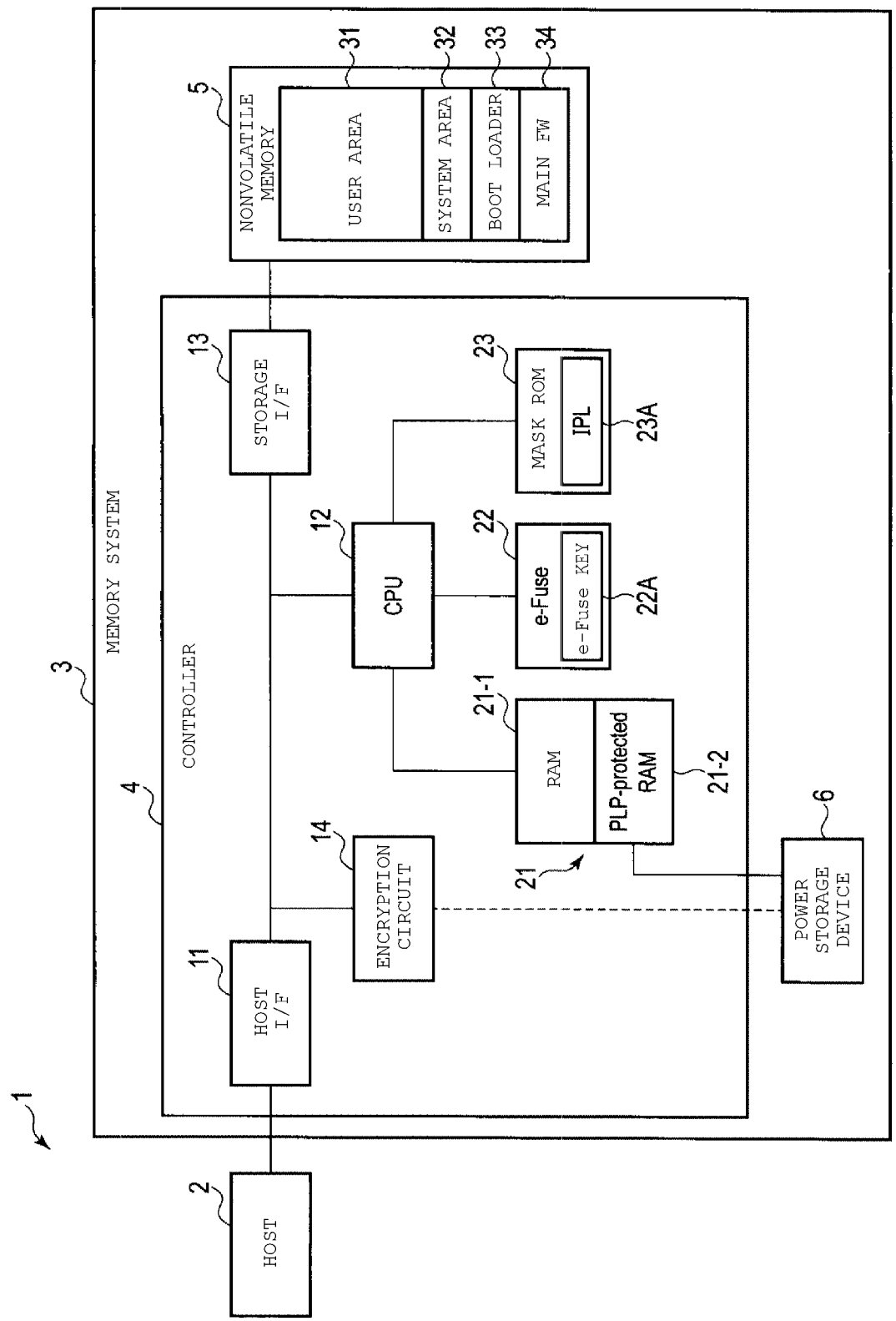
FIG. 1 is a block diagram illustrating a configuration of an information process system including a memory system according to an embodiment.

FIG. 1 is a block diagram illustrating a configuration of an information process system 1 including a memory system according to an embodiment. The information process system 1 includes a host device 2 (hereinafter, also referred to as a host 2) and a memory system 3.

The host 2 is an information process device outside the memory system 3. The host 2 may be a personal computer, a server, a mobile phone, or an imaging device, may be a mobile terminal such as a tablet or a smartphone, or may be an in-vehicle terminal such as a car navigation system.

The memory system 3 is a storage device configured to write data to a nonvolatile memory and read data from the nonvolatile memory. The memory system may be provided as, for example, a solid state drive (SSD). Alternatively, the memory system may be provided as a hard disk drive (HDD) or a memory card.

SCSI, Serial Attached SCSI (SAS), ATA, Serial ATA (SATA), PCI Express (PCIe) (registered trademark), Ethernet (registered trademark), Fibre channel, NVM Express (NVMe) (registered trademark) or the like may be used as an interface connected to the host 2 and the memory system 3.

Hereinafter, a case where the memory system 3 is provided as the SSD will be described.

The memory system 3 may function as a storage device of the host 2. The memory system 3 may be embedded in an information processing device. Alternatively, the memory system 3 may be connected to the information processing device via a cable or a network.

The memory system 3 includes a controller 4, a nonvolatile memory 5, and a power storage device 6.

The controller 4 is a memory controller that controls the nonvolatile memory 5. The controller 4 may be implemented by a circuit such as a System-on-a-chip (SoC). The controller 4 is electrically connected to the nonvolatile memory 5.

The controller 4 functions as a memory controller configured to control the nonvolatile memory 5. For example, the controller 4 has a locking function for permitting access to the nonvolatile memory 5 (i.e., lock release) or prohibiting access to the nonvolatile memory 5 (i.e., lock). The locking function is defined by, for example, the standards of Trusted Computing Group (TCG) and ATA Security.

The controller 4 may function as a flash translation layer (FTL). The FTL is configured to perform data management and block management of the nonvolatile memory 5. The data management performed by the FTL includes (1) management of mapping information indicating a correspondence relationship between logical and physical addresses of the nonvolatile memory 5, (2) a process for concealing read or write on a page basis, and an erase operation on a block basis, and the like. The block management includes defective block management, wear leveling, garbage collection or compaction, and the like. The logical address logically designates a storage location of data. The physical address designates a storage location of physical data in the nonvolatile memory 5. The controller 4 uses a logical-physical address conversion table to manage mapping between the logical and physical addresses on a specific management size basis.

The nonvolatile memory 5 is, for example, a NAND flash memory or a NOR flash memory. The nonvolatile memory 5 may include a plurality of NAND flash memory chips. Alternatively, the nonvolatile memory 5 may include a plurality of NOR type flash memory chips.

The nonvolatile memory 5 includes a user area 31 that may store user data, a system area 32 that may store system data, an area that stores a boot loader 33, an area that stores main firmware (FW) 34, and the like.

The nonvolatile memory 5 includes a plurality of blocks. Each block includes a plurality of pages. One block is a minimum unit of the erase operation. The block may be referred to as an "erase block" or a "physical block". Each page includes a plurality of memory cells connected to the same word line. One page is a unit of data write operation and a data read operation. A word line may be used as a unit for the data write operation and the data read operation.

The number of programs/erase (P/E) cycles for each block has an upper limit, which is referred to as the maximum number of P/E cycles. One P/E cycle of a block includes an erasing operation for setting all memory cells in the block to an erase state, and a write operation for writing data to each page of the block.

Data may be written to one page only once per P/E cycle. Accordingly, the controller 4 writes updated data corresponding to a certain logical address not to a first physical storage location where previous data is stored but to another second physical storage location. Then, the controller 4 associates a previous logical address with the second physical storage location, and furthermore, updates a logical-physical address conversion table such that the first physical storage location is determined to be invalid.

The power storage device 6 is an auxiliary power supply implemented by a capacitor, a battery, or the like. The power storage device 6 functions as a backup power supply when power supplying from an external power supply to the memory system is interrupted. For example, electric charges are accumulated in the power storage device 6 while power is supplied from the external power supply. The power storage device 6 may supply the power stored therein to a specific component in the memory system 3 when the power supplying from the external power supply is interrupted.

Next, a detailed configuration of the controller 4 will be described. The controller 4 includes a host interface (host I/F) 11, a CPU 12, a storage interface (storage I/F) 13, an encryption circuit 14, and the like.

The host I/F 11 is a hardware interface that performs communication between the memory system 3 and the host 2. The host I/F 11 performs a process for receiving various commands and write data from the host 2. The host I/F 11 performs a process for transmitting data indicating success and failure of a process performed in response to a command to the host 2. An example of the commands received from the host 2 include a write command, a read command, an authentication command, a lock release command, and the like.

The CPU 12 is a processor configured to control operations of the controller 4.

The storage I/F 13 is a hardware interface that performs communication between the memory system 3 and the nonvolatile memory 5. The storage I/F 13 may be connected to a plurality of memory chips in the nonvolatile memory 5 through a plurality of channels.

The encryption circuit 14 encrypts and decrypts data. The encryption circuit 14 encrypts user data written to the nonvolatile memory 5. The encryption circuit 14 decrypts the encrypted user data read from the nonvolatile memory 5. The encryption circuit 14 encrypts or decrypts the user data.

The CPU 12 is connected to a random access memory (RAM) 21, an electric fuse (e-Fuse) 22, and a mask ROM 23. The RAM 21 is a temporary storage region for data used in the memory system 3. The e-Fuse 22 stores an e-Fuse Key 22A used for encryption. The mask ROM 23 is hardware whose stored data cannot be altered and is a starting point of trust (i.e., Hardware Root of Trust). The mask ROM 23 stores an initial program load (IPL) 23A. The IPL 23A is a program that is executed first after the memory system 3 starts up.

The RAM 21 includes a RAM 21-1 and a PLP-protected RAM 21-2, i.e., the RAM 21 generally includes a region used as the RAM 21-1 and a region used as the PLP-protected RAM 21-2. Alternatively, two RAMs may be physically provided as the RAM 21-1 and the PLP-protected RAM 21-2.

The RAM 21-1 is a RAM in which stored data is lost when power supplying from an external power supply is interrupted. The PLP-protected RAM 21-2 is a RAM that maintains stored data while the electric charges accumulated in the power storage device 6 are supplied even after the power supplying from the external power supply is interrupted.

The data stored in the PLP-protected RAM 21-2 is protected by using energy of the electric charges stored in the power storage device 6 when the power supplied from the external power supply is interrupted. More specifically, the PLP-protected RAM 21-2 stores the stored data only for the time when the electric charges accumulated in the power storage device 6 is supplied after the power supplying from the external power supply is interrupted. Then, the data stored in the PLP-protected RAM 21-2 is lost upon stop of the supply of the electric charges from the power storage device 6.

The CPU 12 performs a boot operation upon start or restart of power supply to the memory system 3. In the boot operation, various startup processes such as secure boot and LockOnReset may be performed, as described below.

The secure boot is a startup process that involves a program security verification and program switching. In the secure boot, alteration of the startup program, which is used when the memory system 3 starts up, such as a boot loader 33 and main FW 34, is detected. Security of the memory system 3 is strengthened by the secure boot. An example of a secure boot sequence will be described below.

The LockOnReset is a startup process that prohibits or locks an access to user data stored in the nonvolatile memory 5 due to a specific event. Here, the access is, for example, read and write. The memory system 3 supports the LockOnReset. From a viewpoint of information security, it is recommended that the LockOnReset is performed every PowerCycle, that is, every time power supply from an external power supply starts.

The controller 4 permits an access to the nonvolatile memory 5, which has been prohibited at the time of the LockOnReset, (i.e., lock release) according to the received lock release command and authentication information (i.e., credentials). When the received authentication information is valid, the controller 4 permits the access to the nonvolatile memory 5 that has been prohibited at the time of the LockOnReset. The authentication information is, for example, a password or a personal identification number (PIN). In order to permit access to the nonvolatile memory 5 in response to the lock release command, authentication information needs to be stored in the host 2 or input by the user. When storing the authentication information, information security has to be secured.

Figure 2:
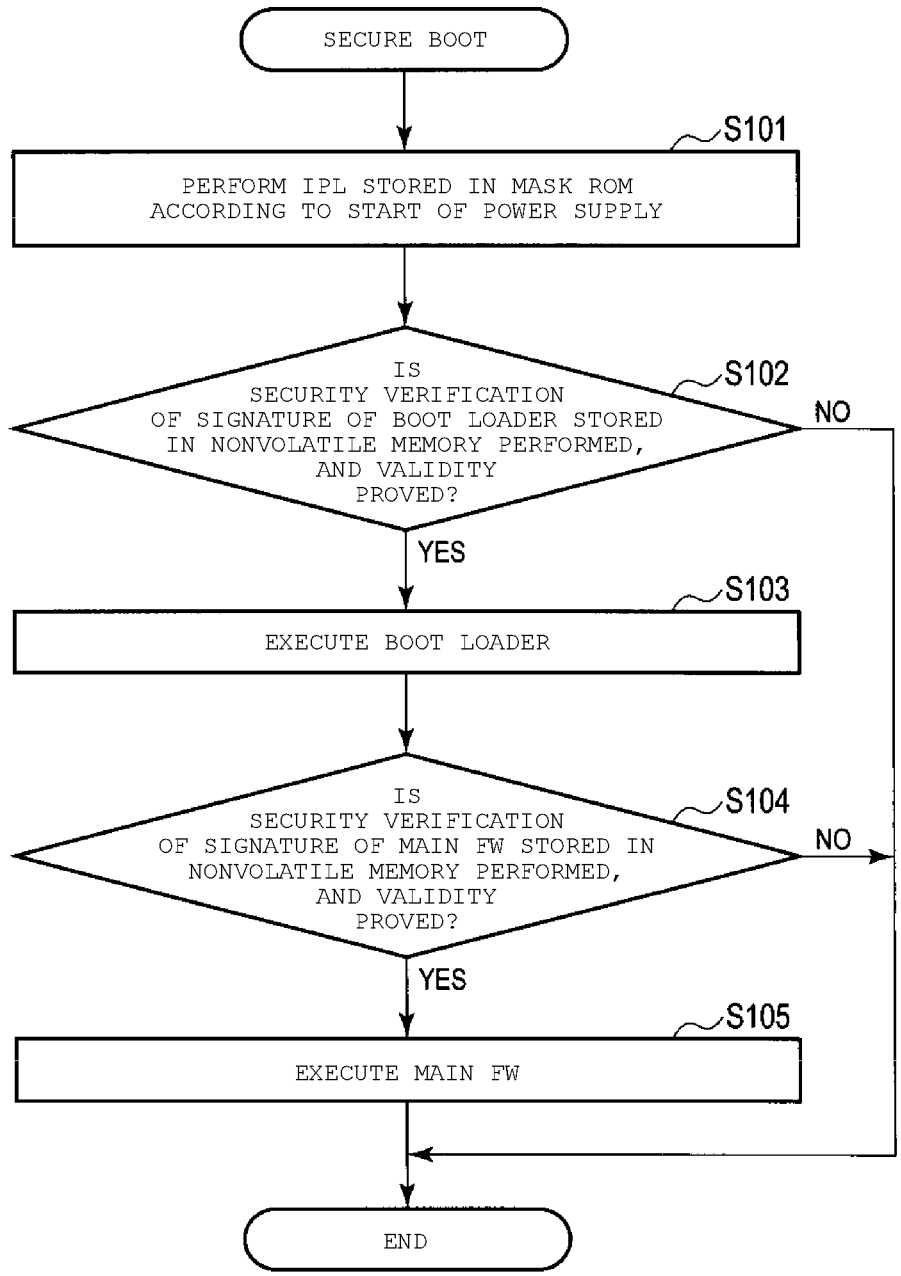
FIG. 2 is a flowchart of a secure boot performed by the memory system.

Next, an example of a secure boot sequence will be described. FIG. 2 is a flowchart of the secure boot sequence performed by the memory system according to the embodiment.

When power supply to the memory system 3 starts, the CPU 12 executes the IPL 23A stored in the mask ROM 23 (S101). The CPU 12 that executes the IPL 23A performs security verification on a signature of the boot loader 33 stored in the nonvolatile memory 5 and determines whether or not validity is proved as a result of the security verification (S102).

When the validity is not proved as the result of the security verification (NO in S102), the secure boot ends. In this case, since there is a possibility that the signature of the boot loader 33 is not valid and the boot loader 33 is altered, the memory system 3 does not start.

When the validity is proved as the result of the security verification (YES in S102), the CPU 12 executes the boot loader 33 (S103). That is, an operation of the CPU 12 shifts from a control by the IPL 23A to a control by the boot loader 33.

The CPU 12 executing the boot loader 33 verifies security of a signature of the main FW 34 stored in the nonvolatile memory 5 and determines whether or not the validity is verified (S104).

When the validity is not proved as the result of the security verification (NO in S104), the secure boot ends. In this case, since the signature of the main FW 34 is not valid and the main FW 34 may be altered, the memory system 3 does not start up.

When the validity is proved as the result of the security verification (YES in S104), the CPU 12 executes the main FW 34 (S105). That is, the operation of the CPU 12 shifts from the control by the boot loader 33 to the control by the main FW 34. Thereby, the secure boot ends.

As such, the CPU 12 verifies the signature of the program (i.e., the boot loader and main FW) on the basis of the IPL 23A stored in hardware that cannot be altered (Hardware Root of Trust). The CPU 12 executes the program only when the validity is proved as the result of the security verification. When the validity is not proved as the result of the security verification, the CPU 12 does not execute the program. The encryption circuit 14 is configured to perform the security verification.

However, various methods for detecting alteration of FW are proposed. For example, there is a method of providing a verification module for detecting whether or not the FW is altered in a device or the FW. In this method, when the FW is executed, the verification module detects whether or not a part of the code in the FW is altered. However, this method cannot verify the alteration of the FW when the module or the FW in the device is altered fully.

In the present embodiment, the boot loader 33 and the main FW 34 are verified by the secure boot on the basis of the IPL 23A. Since reliability is secured, alteration in the boot loader 33 and the main FW 34 can be detected.

Figure 3:
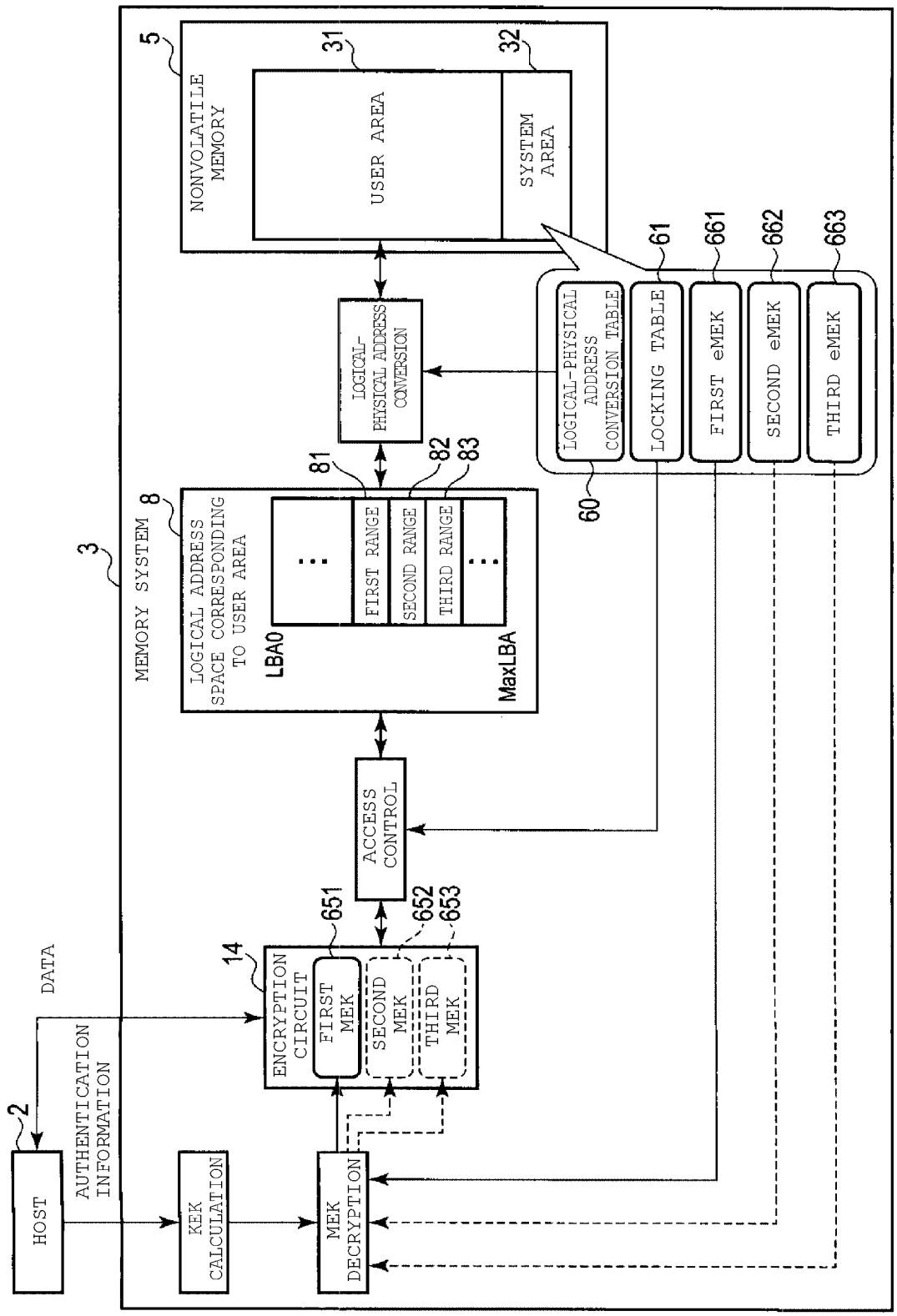
FIG. 3 is a block diagram illustrating a detailed configuration of the memory system.

FIG. 3 is a block diagram illustrating a detailed configuration of the memory system 3 according to the embodiment. The user area 31 and the system area 32 are defined in the storage region of the nonvolatile memory 5.

A plurality of regions (hereinafter, also referred to as ranges) used by a plurality of users may be set in a logical address space 8 corresponding to the user area 31. Sizes of the plurality of ranges may be the same as each other or may be different from each other.

A first range 81 that is a region used by a first user, a second range 82 that is a region used by a second user, and a third range 83 that is a region used by a third user are respectively set in the logical address space 8 corresponding to the user area 31. In the example illustrated in FIG. 3, the first range 81, the second range 82, and the third range 83 are set continuously in the logical address space 8. However, the first range 81, the second range 82, and the third range 83 may be set as dispersed regions in the logical address space 8.

The first range 81, the second range 82, and the third range 83 are each encrypted, and a first encryption key for the encryption is referred to as a media encryption key (MEK). A MEK of the first range 81 is referred to as a first MEK 651. A MEK of the second range 82 is referred to as a second MEK 652. A MEK of the third range 83 is referred to as a third MEK 653. Further, data obtained by encrypting the first MEK 651 is referred to as a first eMEK 661. Data obtained by encrypting the second MEK 652 is referred to as a second eMEK 662. Data obtained by encrypting the third MEK 653 is referred to as a third eMEK 663. The first eMEK 661, the second eMEK 662, and the third eMEK 663 are stored in the system area 32.

A second encryption key for encrypting the first eMEK 661, the second eMEK 662, and the third eMEK 663 is referred to as a key encryption key (KEK). The KEK is generated by using authentication information received from the host 2.

A logical-physical address conversion table 60 is stored in the system area 32. The logical-physical address conversion table 60 illustrates a correspondence relationship between a logical address (for example, LBA) indicating a location in the logical address space 8 and a physical address indicating a location in the user area 31. The physical address corresponding to a certain logical address indicates a physical storage location in the user area 31 to which data of the logical address is written. For example, the logical address space 8 includes logical addresses from 0 to a specific value (MaxLBA in FIG. 3). Further, the system area 32 further stores a locking table 61. The locking table 61 manages an access right to each range. The controller 4 controls a read access and a write access to each range based on the locking table 61.

FIG. 4 is a diagram illustrating the locking table 61 according to the embodiment. The locking table 61 may include a plurality of entries corresponding to a plurality of ranges. The plurality of ranges may include not only a range for each user but also a global range representing the entire user area 31.

The entry includes items such as UID, Name, RangeStart, RangeLength, ReadLockEnabled, WriteLockEnabled, ReadLocked, WriteLocked, and LockOnReset.

The "UID" indicates identification information given to each range. The "Name" indicates a name of the range. The "RangeStart" indicates a start location of the range. The "RangeLength" indicates a length or size of the range.

The "ReadLockEnabled" indicates whether or not reading from the range can be prohibited. TRUE or FALSE is set to the "ReadLockEnabled". Setting of FALSE as the "ReadLockEnabled" indicates that reading from the range cannot be prohibited. Setting of TRUE as "ReadLockEnabled" indicates that reading from the range can be prohibited.

The "WriteLockEnabled" indicates whether or not writing to the range can be prohibited. TRUE or FALSE is set to the "WriteLockEnabled". Setting of FALSE as "WriteLockEnabled" indicates that writing to the range cannot be prohibited. Setting of TRUE as "WriteLockEnabled" indicates that writing to the range can be prohibited.

The "ReadLocked" indicates whether or not reading from the range is prohibited. TRUE or FALSE is set to the "ReadLocked". Setting of FALSE as "ReadLocked" indicates that reading from the range is not prohibited. Setting of TRUE to both the "ReadLocked" and the "ReadLockEnabled" indicates that reading from the range is prohibited.

The "WriteLocked" indicates whether or not writing to the range is prohibited. TRUE or FALSE is set to the "WriteLocked". Setting of FALSE as the "WriteLocked" indicates that writing to the range is not prohibited. Setting of TRUE to both the "WriteLocked" and the "WriteLockEnabled" indicates that writing to the range is prohibited.

The "LockOnReset" indicates an event serving as a trigger for performing the "LockOnReset". For example, "PowerCycle" is set in the "LockOnReset".

FIG. 5 is a block diagram further illustrating the locking table 61 according to the embodiment. FIG. 5 illustrates a locking table 61A before the LockOnReset is performed and a locking table 61B after the LockOnReset is performed. The controller 4 may change the locking table 61 stored in the nonvolatile memory 5 by performing the LockOnReset.

In each entry included in the locking table 61A before the LockOnReset is performed, TRUE is set to each of the "ReadLockEnabled", and the "WriteLockEnabled" and FALSE is set to each of the "ReadLocked", and the "WriteLocked". That is, reading and writing are permitted for the ranges corresponding to each entry.

On the contrary, in each entry included in the locking table 61B after the LockOnReset is performed, TRUE is set to each of the "ReadLockEnabled", the "WriteLockEnabled", the "ReadLocked", and the "WriteLocked". That is, read from and write to the range corresponding to each entry are prohibited.

As described above, when the LockOnReset is performed, read and write for all ranges are prohibited. Thus, all ranges are protected by the LockOnReset.

FIG. 6 is a block diagram further illustrating the locking table 61 according to the embodiment. FIG. 6 illustrates a locking table 61C before a lock release process is performed and a locking table 61D after the lock release process is performed. The controller 4 performs a process according to a lock release command received from the host 2. Thereby, the controller 4 may change the locking table 61 stored in the nonvolatile memory 5. FIG. 6 illustrates a case where the lock release command received from the host 2 is a command for permitting read and write of the first range 81. The first range 81 corresponds to an entry in which "Range1" is set in "Name" in the locking table 61.

In each entry included in the locking table 61C before the lock release process is performed, TRUE is set to each of "ReadLockEnabled", "WriteLockEnabled", "ReadLocked", and "WriteLocked". That is, read from and write to the range corresponding to each entry are prohibited.

On the contrary, in the locking table 61D after the lock release process is performed, FALSE is set to each of "ReadLocked" and "WriteLocked" in the entry corresponding to the first range 81. That is, read from and write to the first range 81 are permitted.

FIG. 7 is a flowchart of a locking table setting process performed by the memory system 3 according to the embodiment.

The controller 4 acquires a lock release command and authentication information from the host 2 (S201). Next, the controller 4 determines whether or not the acquired authentication information is valid (S202).

If the acquired authentication information is not valid (NO in S202), the controller 4 ends the process of FIG. 7.

When the acquired authentication information is valid (YES in S202), the controller 4 acquires an entry corresponding to one range designated by the acquired lock release command from the locking table 61 (S203). The lock release command requests permission of at least one of read from and write to the designated range.

Next, the controller 4 determines whether or not the lock release command requests a read permission for one designated range (S204). When the lock release command requests the read permission for one designated range (YES in S204), the controller 4 sets FALSE to the "ReadLocked" of the acquired entry (S205), and proceeds to S206. If the lock release command does not request the read permission for one designated range (NO in S204), the controller 4 proceeds to S206.

Then, the controller 4 determines whether or not the lock release command requests write permission to one designated range (S206). When the lock release command requests the write permission to one designated range (YES in S206), the controller 4 sets FALSE to the "WriteLocked" of the acquired entry (S207), and proceeds to S208. If the lock release command does not request the write permission to the one designated range (NO in S206), the controller 4 proceeds to S208.

The controller 4 determines whether or not there is another range designated by the acquired lock release command (S208). When there is another range designated by the lock release command (YES in S208), the controller 4 proceeds to S203 for the designated another range. When there is no other range designated by the lock release command (NO in S208), the controller 4 ends the process of FIG. 7.

With the process in FIG. 7, the controller 4 rewrites the locking table 61 according to the lock release command received from the host 2.

Here, a sequence of storing a MEK in a register in the encryption circuit 14 will be described. FIG. 8 is a flowchart of a MEK setting process performed by the memory system 3 according to the embodiment.

The controller 4 calculates a KEK using the received authentication information (S301). Further, the controller specifies a range from the received authentication information and reads an eMEK corresponding to the specified range from the system area 32 (S302). The controller 4 acquires a MEK by decrypting the read eMEK with the calculated KEK (S303). Then, the controller 4 stores the acquired MEK in a register in the encryption circuit (S304). After S304, the controller 4 ends the process of FIG. 8.

For example, when the authentication information of the first range 81 used by a first user is received from the host 2, the controller 4 calculates the KEK of the first range 81 by using the received authentication information. The controller 4 reads the first eMEK 661 from the system area 32. The controller 4 acquires the first MEK 651 by decrypting the read first eMEK 661 with the calculated KEK. Then, the controller 4 stores the acquired first MEK 651 in a register in the encryption circuit 14.

While the register in the encryption circuit 14 stores the first MEK 651, the controller 4 can use the encryption circuit 14 to encrypt user data to be written in the first range 81 with the first MEK 651. Further, while the register in the encryption circuit 14 stores the first MEK 651, the controller 4 can decrypt the encrypted user data read from the first range 81 with the first MEK 651.

Likewise, when receiving the authentication information of the second range 82 used by a second user from the host 2, the controller 4 acquires the second MEK 652 and stores second MEK 652 in the register in the encryption circuit 14. Further, when receiving the authentication information of the third range 83 used by the third user from the host 2, the controller 4 acquires the third MEK 653 and stores it in the register in the encryption circuit 14.

While the register in the encryption circuit 14 stores the MEK of a certain range, the controller 4 can use the encryption circuit 14 to encrypt user data to be written in the range with the MEK. Further, while the MEK of a certain range is stored in the register in the encryption circuit 14, the controller 4 can decrypt the user data read from the range with the MEK.

The controller 4 can define a range by receiving a command for defining the range from the host 2. The command for defining the range designates, for example, a start location and a size of the range.

When a certain range is defined, the controller 4 generates a MEK for encrypting/decrypting user data stored in the range by using, for example, a pseudo-random number generator in the encryption circuit 14. The controller 4 encrypts the generated MEK with the KEK and stores encrypted MEK in the system area 32. The KEK may be generated by using authentication information previously received prior to the command for generating the range (for example, authentication information received with the authentication command).

Further, the controller 4 may treat the entire user area 31 as a range called a global range and generate a MEK corresponding to the global range. The MEK corresponding to the global range is generated, for example, when the memory system 3 is manufactured. The controller 4 encrypts the MEK corresponding to the generated global range with KEK and stores the encrypted MEK in the system area 32.

The MEK stored in the register in the encryption circuit 14 is lost when power supplying is interrupted. When the power supplying from the outside is interrupted, power can be supplied from the power storage device 6 to the encryption circuit 14. If the power supplying from the outside is restarted while the power is supplied from the power storage device 6, the MEK stored in the register in the encryption circuit 14 is not lost.

Figure 9:
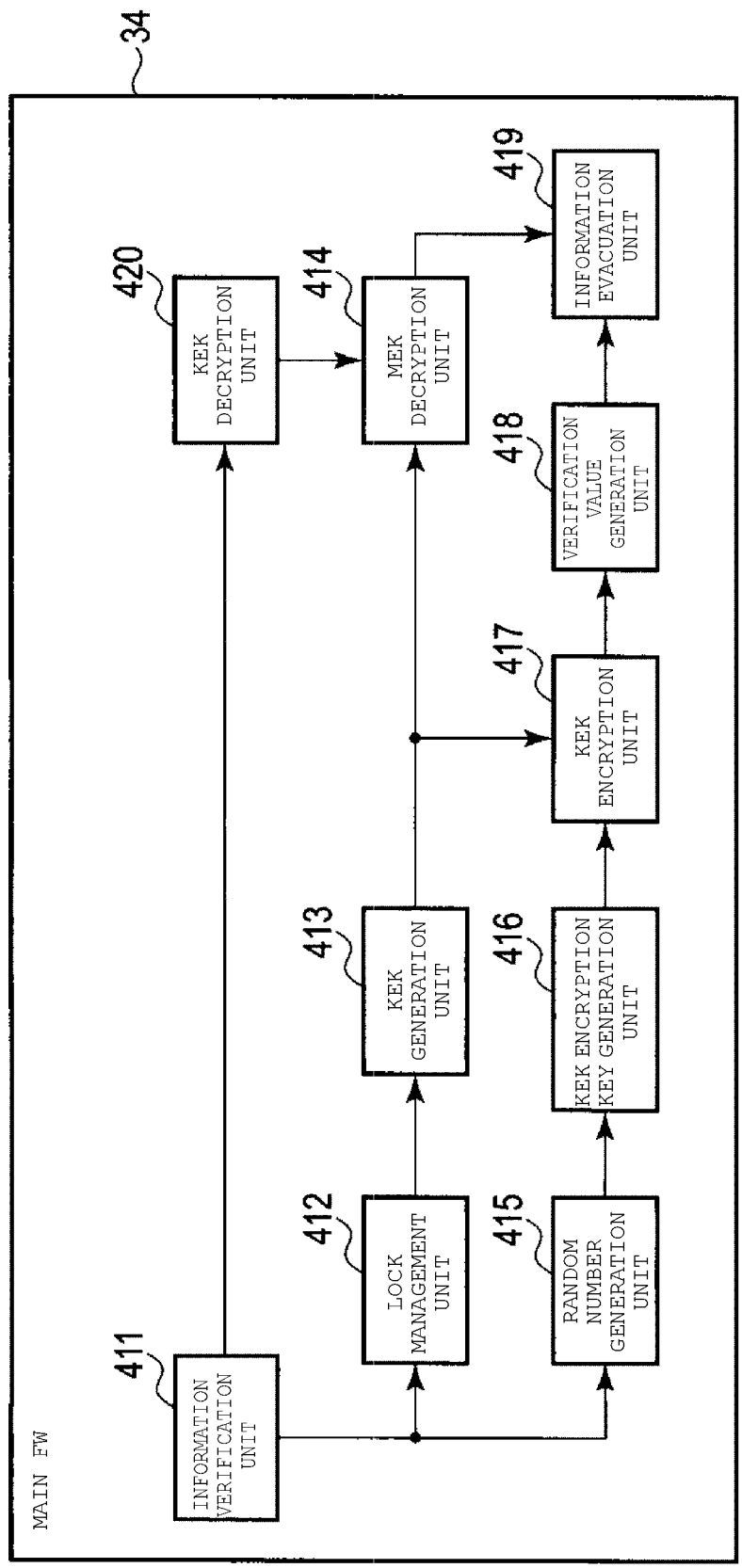
FIG. 9 is a block diagram illustrating a functional configuration of main firmware executed by the memory system.

FIG. 9 is a block diagram illustrating a functional configuration of the main FW 34 executed by the memory system according to the embodiment. The main FW 34 includes a plurality of function units including an information verification unit 411, a lock management unit 412, a KEK generation unit 413, a MEK decryption unit 414, a random number generation unit 415, a KEK encryption key generation unit 416, a KEK encryption unit 417, a verification value generation unit 418, an information evacuation unit 419, and a KEK decryption unit 420.

If power is supplied from an external power supply to the memory system 3 and the main FW 34 is executed, the information verification unit 411 determines whether or not valid lock release information 51 (also referred to as first information) is stored. The lock release information 51 indicates that an access to at least a partial region (for example, at least one range) of the nonvolatile memory 5 is permitted. The lock release information 51 includes, for example, information indicating that an access to the user area 31 is permitted when the memory system 3 starts up recently. Further, a verification value 52 is a value for validating the lock release information 51. A hash value, a checksum, a hash-based message authentication code (HMAC), or the like may be used as the verification value 52. At this time, if the PLP-protected RAM 21-2 is operated by the electric charges stored in the power storage device 6 within time, the lock release information 51 stored at the time of previous startup of the memory system 3 and the verification value 52 thereof are stored without being lost. The PLP-protected RAM 21-2 is a region where the lock release information 51 and the verification value 52 thereof can be stored.

The information verification unit 411 stores the lock release information 51 and the verification value 52 thereof in the PLP-protected RAM 21-2, and determines that the valid lock release information 51 is stored when the validity is proved as a result of the verification of the lock release information 51 using the verification value 52.

The information verification unit 411 stores the lock release information 51 and the verification value 52 thereof in the PLP-protected RAM 21-2, and determines that the valid lock release information 51 is not stored when the validity is not proved as the result of the verification of the lock release information 51 using the verification value 52. Further, the information verification unit 411 determines that the valid lock release information 51 is not stored when either the lock release information 51 or the verification value 52 is not stored in the PLP-protected RAM 21-2.

When the information verification unit 411 determines that the valid lock release information 51 is not stored, the lock management unit 412, the KEK generation unit 413, and the MEK decryption unit 414 relating to lock release, and the random number generation unit 415, the KEK encryption key generation unit 416, the KEK encryption unit 417, the verification value generation unit 418, and the information evacuation unit 419 relating to evacuation of the lock release information 51 operate.

First, operations of the lock management unit 412, the KEK generation unit 413, and the MEK decryption unit 414 relating to the lock release will be described.

When the information verification unit 411 determines that the valid lock release information 51 is not stored, the lock management unit 412 performs the first LockOnReset. After performing the first LockOnReset, the lock management unit 412 acquires a lock release command and authentication information. Based on the acquired lock release command and authentication information, the lock management unit 412 updates the locking table 61 such that an access to a certain range (also referred to as a first range) is permitted. For example, when the acquired lock release command is for the range associated with a first user and the acquired authentication information is valid, the lock management unit 412 updates the locking table 61 such that the access to the range associated with the first user is permitted.

The KEK generation unit 413 calculates a KEK by using the authentication information acquired by the lock management unit 412.

The MEK decryption unit 414 reads an eMEK from the system area 32 based on the received lock release command. The eMEK is data obtained by previously encrypting the MEK in a certain range by using the KEK as an encryption key. The MEK decryption unit 414 decrypts the read eMEK with the KEK calculated by the KEK generation unit 413 and acquires the MEK. Then, the MEK decryption unit 414 stores the acquired MEK in a register in the encryption circuit 14.

The locking table 61 is updated and the MEK is stored in a register in the encryption circuit 14 by the operations of the lock management unit 412, the KEK generation unit 413, and the MEK decryption unit 414 described above. Thereby, the access to the certain range is permitted.

Next, operations of the random number generation unit 415, the KEK encryption key generation unit 416, the KEK encryption unit 417, the verification value generation unit 418, and the information evacuation unit 419 relating to evacuation of the lock release information 51 will be described.

When the information verification unit 411 determines that the valid lock release information 51 is not stored, the random number generation unit 415 generates a volatile random number 511. For example, the generated volatile random number 511 is different for each time the memory system 3 starts up. The random number generation unit 415 may use a pseudo random number generator provided in the encryption circuit 14 to generate the volatile random number 511.

The KEK encryption key generation unit 416 generates an encryption key for encrypting a KEK (i.e., KEK encryption key) by using the volatile random number 511 generated by the random number generation unit 415. The KEK encryption key generation unit 416 generates the KEK encryption key by, for example, an exclusive OR (XOR) operation between the volatile random number 511 and the e-Fuse Key 22A stored in the e-Fuse 22.

The KEK encryption unit 417 encrypts the KEK generated by the KEK generation unit 413 with the KEK encryption key generated by the KEK encryption key generation unit 416. The encrypted KEK is called an eKEK. The KEK encryption unit 417 may generate a plurality of eKEKs corresponding to a plurality of ranges whose lock is released. Hereinafter, the plurality of eKEKs are also referred to as eKEKs.

The verification value generation unit 418 generates the verification value 52 of the lock release information 51. The lock release information 51 includes the volatile random number 511 generated by the random number generation unit 415, a range index list 512 indicating a range whose lock is released, and an eKEK 513 generated by the KEK encryption unit 417. The verification value generation unit 418 may use the encryption circuit 14 to generate the verification value 52.

The information evacuation unit 419 stores the lock release information 51 and the verification value 52 in the PLP-protected RAM 21-2.

The operations of the random number generation unit 415, the KEK encryption key generation unit 416, the KEK encryption unit 417, the verification value generation unit 418, and the information evacuation unit 419 relating to evacuation of the lock release information 51 make the lock release information 51 evacuate in the PLP-protected RAM 21-2.

The PLP-protected RAM 21-2 may store the stored lock release information 51 and verification value 52 while the electric charges stored in the power storage device 6 is supplied (for example, for one second), even after the power from the external power supply is interrupted. Thus, if the power from the external power supply is restarted within this time period after the interruption, the lock release information 51 stored at the time of previous startup of the memory system 3 and the verification value 52 thereof is stored in the PLP-protected RAM 21-2 without being lost.

When the information verification unit 411 determines that the valid lock release information 51 is stored, the lock management unit 412, the KEK decryption unit 420, and the MEK decryption unit 414 use the lock release information 51 to perform an operation for reproducing the range index list 512 and the data stored in a register of the encryption circuit 14 at the time of the most recent startup of the memory system 3. Hereinafter, the lock management unit 412, the KEK decryption unit 420, and the MEK decryption unit 414 are also referred to as configurations relating to reproduction of an access state.

When the information verification unit 411 determines that the valid lock release information 51 is stored, the lock management unit 412 performs a second LockOnReset.

The lock management unit 412 does not prohibit an access to the range indicated in the range index list 512 included in the lock release information 51 during the second LockOnReset. Since the lock management unit 412 does not prohibit the access, a value indicating permission of the access (i.e., lock release) to the range indicated in the range index list 512 remains set in the locking table 61. For example, if the locking table 61 of FIG. 4 is used, FALSE remains set to the ReadLocked and WriteLocked of the entry for the range indicated in the range index list 512. As described above, the ReadLocked is an item indicating whether or not data reading from the corresponding range is prohibited. The WriteLocked is an item indicating whether or not data writing to the corresponding range is prohibited.

Further, the lock management unit 412 prohibits an access to a range not indicated in the range index list 512 at the time of the second LockOnReset. More specifically, the lock management unit 412 sets a value indicating access prohibition to an entry (i.e., lock) for a range not indicated in the range index list 512 of the locking table 61. For example, if the locking table 61 of FIG. 4 is used, the lock management unit 412 sets TRUE to the ReadLocked and WriteLocked of the entry for the range indicated in the range index list 512.

The KEK decryption unit 420 decrypts the eKEKs 513 included in the lock release information 51 and acquires the KEK. Specifically, the KEK decryption unit 420 generates a KEK encryption key by using the volatile random number 511 and the e-Fuse Key 22A included in the lock release information 51. The KEK decryption unit 420 decrypts the eKEKs 513 with the generated KEK encryption key and acquires the KEK.

The MEK decryption unit 414 reads an eMEK corresponding to the KEK decrypted by the KEK decryption unit 420 from the system area 32. The MEK decryption unit 414 decrypts the eMEK with the KEK and acquires the MEK. Then, the MEK decryption unit 414 sets the MEKs in the encryption circuit 14.

By the configuration relating to reproduction of the access state described above, the range index list 512 and the content of the register in the encryption circuit 14 can be reproduced at the time of the most recent startup of the memory system 3 by using the effective lock release information 51.

When it is desired to verify the boot loader 33 and the main FW 34 of the memory system 3 during operation by using the secure boot, the power supply to the memory system 3 may be stopped and the power supply may be immediately restarted. If an interval between the stop and restart of the power supply is sufficiently short, the lock release information 51 stored in the PLP-protected RAM 21-2 will not be lost. That is, if the PLP-protected RAM 21-2 can be operated with the power supplied from the power storage device 6, the lock release information 51 stored in the PLP-protected RAM 21-2 is not lost.

If the lock release information 51 stored in the PLP-protected RAM 21-2 is the valid lock release information 51, the controller 4 (more specifically, the configuration relating to the reproduction of the access state described above) uses the valid lock release information 51 to reproduce the range index list 512 and the data stored in the register of the encryption circuit 14 immediately before the power supplying is stopped. At this time, the controller 4 does not acquire the authentication information stored in the host 2 or the authentication information input by a user from the host 2.

Further, since the secure boot is performed on the basis of the mask ROM 23 whose stored data cannot be altered, the alteration is detected even if the boot loader 33 and the main FW 34 are altered.

Furthermore, if the interval between stop and restart of the power supply from an external power supply to the memory system 3 is long, that is, if the interval exceeds the time that the PLP-protected RAM 21-2 can operate with the power supplied from the power storage device 6, the lock release information 51 and the verification value 52 thereof are securely erased.

Figure 10:
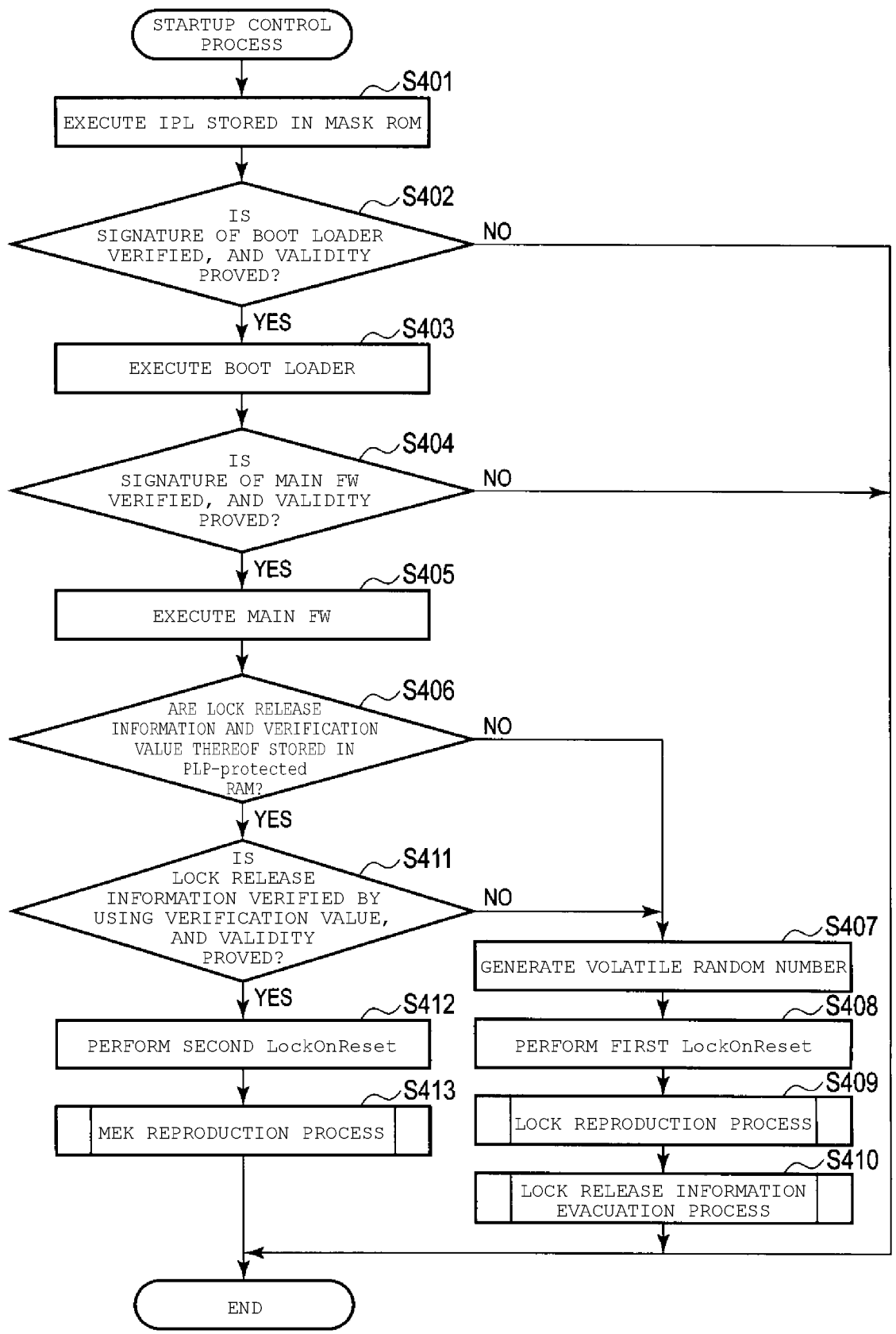
FIG. 10 is a flowchart of a startup control process performed by the memory system.

FIG. 10 is a flowchart of a startup control process performed by the memory system 3 according to the embodiment.

The CPU 12 executes the IPL 23A stored in the mask ROM 23 in response to start of power supply to the memory system 3 (S401). The CPU 12 executing the IPL 23A verifies a signature of the boot loader 33 stored in the nonvolatile memory 5 and determines whether or not validity is proved (S402).

When the validity of the signature of the boot loader 33 is proved (YES in S402), the CPU 12 executes the boot loader 33 (S403).

When the validity of the signature of the boot loader 33 is not proved (NO in S402), the startup control process ends. In this case, there is a possibility that the signature of the boot loader 33 is not valid and the boot loader 33 is altered.

The CPU 12 executing the boot loader 33 verifies a signature of the main FW 34 stored in the nonvolatile memory 5 and determines whether or not validity is proved (S404).

When the validity of the signature of the main FW 34 is proved (YES in S404), the CPU 12 executes the main FW 34 (S405).

When the validity of the signature of the main FW 34 is not proved (NO in S404), the startup control process ends. In this case, there is a possibility that the signature of the main FW 34 is not valid and the main FW 34 is altered.

The CPU 12 executing the main FW 34 determines whether or not the lock release information 51 and the verification value 52 thereof are stored in the PLP-protected RAM 21-2 (S406). At this time, if the PLP-protected RAM 21-2 is operated with electric charges stored in the power storage device 6, the lock release information 51 and the verification value 52 stored at the time of previous startup of the memory system 3 are stored without being lost.

When the lock release information 51 and verification value 52 thereof are stored in the PLP-protected RAM 21-2 (YES in S406), the CPU 12 verifies the lock release information 51 by using the verification value 52 and determines whether or not the validity is proved (S411). More specifically, the CPU 12 calculates a hash value based on the lock release information 51 and collates the calculated hash value with the verification value 52 stored in the PLP-protected RAM 21-2. If both match, the CPU 12 determines that the validity of the lock release information 51 is proved. If both do not match, the CPU 12 determines that the validity of the lock release information 51 is not proved.

When the validity of the lock release information 51 is proved (YES in S411), the CPU 12 performs the second LockOnReset (S412). More specifically, the CPU 12 prohibits an access to a range not illustrated in the range index list 512 included in the lock release information 51.

When the validity of the lock release information 51 is not proved (NO in S411), the CPU 12 proceeds to the process of S407.

After S412, the CPU 12 performs a MEK reproduction process (S413). An example of a specific sequence of the MEK reproduction process will be described below.

After completion of the MEK reproduction process in S413, the startup control process ends. In this case, the memory system 3 starts up.

In S406, when the lock release information 51 and the verification value 52 are not stored in the PLP-protected RAM 21-2 (NO in S406), the CPU 12 generates a volatile random number (S407) and performs the first LockOnReset (S408). The CPU 12 locks the user area 31 in the nonvolatile memory 5 by the first LockOnReset. That is, an access to the user area 31 is set to a prohibited state. The CPU 12 may perform the first LockOnReset before generating the volatile random number or may generate the volatile random number and perform the first LockOnReset in parallel.

After performing the first LockOnReset in S408, the CPU 12 performs a lock release process (S409). An example of a specific sequence for the lock release process will be described below.

After the lock release process of S409 is completed, the CPU 12 performs a lock release information evacuation process (S410). An example of a specific sequence of the lock release information evacuation process will be described below.

After the lock release information evacuation process is completed in S410, the startup control process ends. In this case, the memory system 3 start up.

Figure 11:
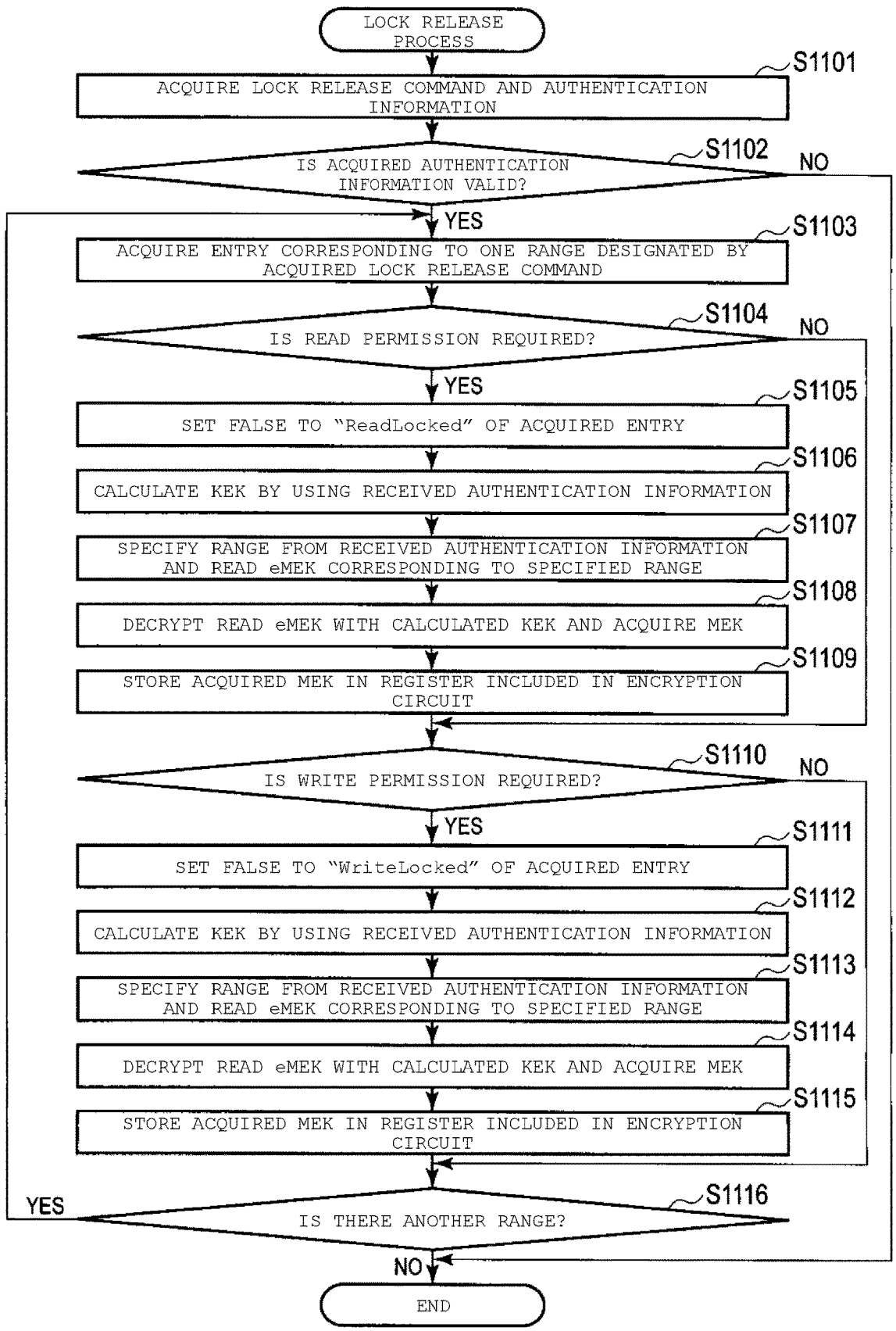
FIG. 11 is a flowchart of a lock release process performed by the memory system.

FIG. 11 is a flowchart of the lock release process performed by the memory system 3 according to the embodiment. For example, the lock release process may be performed by the CPU 12 configured to perform a group of commands included in the main FW 34.

The controller 4 acquires a lock release command and authentication information from the host 2 (S1101). Next, the controller 4 determines whether or not the acquired authentication information is valid (S1102).

When the acquired authentication information is not valid (NO in S1102), the controller 4 ends the process of FIG. 11.

If the acquired authentication information is valid (YES in S1102), the controller 4 acquires an entry corresponding to one range designated by the acquired lock release command from the locking table 61 (S1103). The lock release command requests permission for at least one of read and write for the designated range.

Next, the controller 4 determines whether or not the acquired lock release command requests a read permission for one designated range (first range) (S1104).

When the lock release command requests a read permission for the designated range (YES in S1104), the controller 4 sets FALSE to the "ReadLocked" of the acquired entry (S1105).

After S1105, the controller 4 calculates a KEK by using the received authentication information (S1106). Further, the controller 4 specifies a range from the received authentication information and reads an eMEK corresponding to the specified range from the system area 32 (S1107). The controller 4 acquires a MEK by decrypting the read eMEK with the calculated KEK (S1108). Then, the controller 4 stores the acquired MEK in a register in the encryption circuit (S1109). The controller 4 proceeds to S1110.

If the lock release command does not request the read permission for the range (NO in S1104), the controller 4 proceeds to S1110.

Next, the controller 4 determines whether or not the lock release command requests a write permission for the designated range (S1110).

If the lock release command requests the write permission for one designated range (first range) (YES in S1110), the controller 4 sets FALSE to the "WriteLocked" of the acquired entry (S1111).

After S1111, the controller 4 calculates a KEK by using the received authentication information (S1112). Further, the controller 4 specifies a range from the received authentication information and reads an eMEK corresponding to the specified range from the system area 32 (S1113). The controller 4 acquires a MEK by decrypting the read eMEK with the calculated KEK (S1114). Then, the controller 4 stores the acquired MEK in a register in the encryption circuit (S1115). The controller 4 proceeds to S1116.

If the lock release command does not request the write permission for the range (NO in S1110), the controller 4 proceeds to S1116.

Next, the controller 4 determines whether or not there is another range designated by the acquired lock release command (S1116). If there is another range designated by the lock release command (YES in S1116), the controller 4 proceeds to S1103 for another range. If there is no other range designated by the lock release command (NO in S1116), the controller 4 ends the process of FIG. 11.

Figure 12:
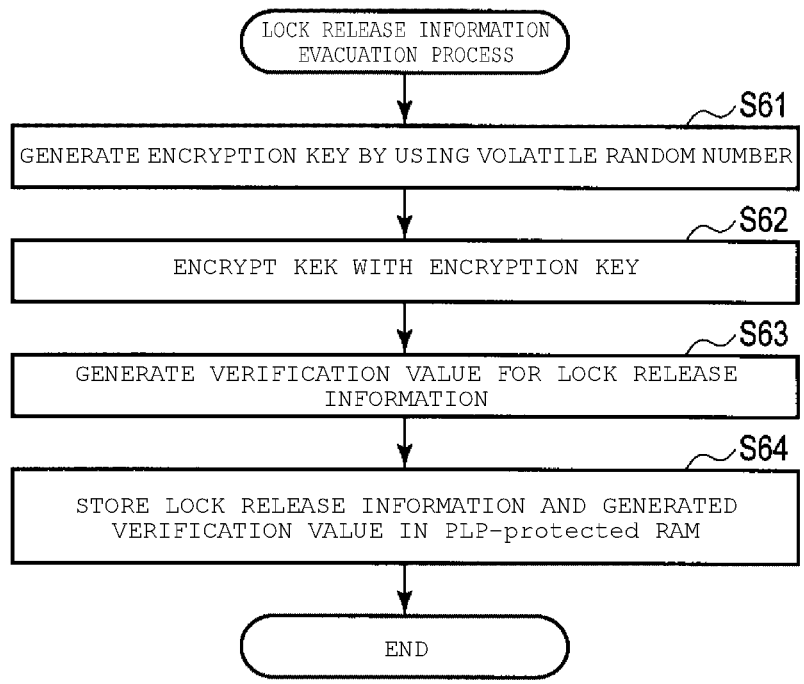
FIG. 12 is a flowchart of a lock release information evacuation process performed by the memory system.

FIG. 12 is a flowchart of the lock release information evacuation process performed by the memory system according to the embodiment. For example, the lock release information evacuation process may be performed as the CPU 12 configured to perform a group of commands included in the main FW 34.

The CPU 12 generates an encryption key by using the volatile random number 511 (S61). The encryption key is obtained by, for example, an XOR operation between the volatile random number 511 and the e-Fuse Key 22A. Further, the volatile random number 511 is generated in S407 of FIG. 10. Subsequently, the CPU 12 encrypts the KEK with the generated encryption key and acquires the encrypted KEK 513 (S62). The CPU 12 generates the verification value 52 for the lock release information 51 including the volatile random number 511, the range index list 512, and the encrypted KEK 513 (S63). The CPU 12 stores the lock release information 51 and the generated verification value 52 in the PLP-protected RAM 21-2 (S64). After S64, the CPU 12 ends the lock release information evacuation process of FIG. 12.

Through the above-described lock release information evacuation process, the lock release information 51 and the verification value 52 can be evacuated in the PLP-protected RAM 21-2.

Figure 13:
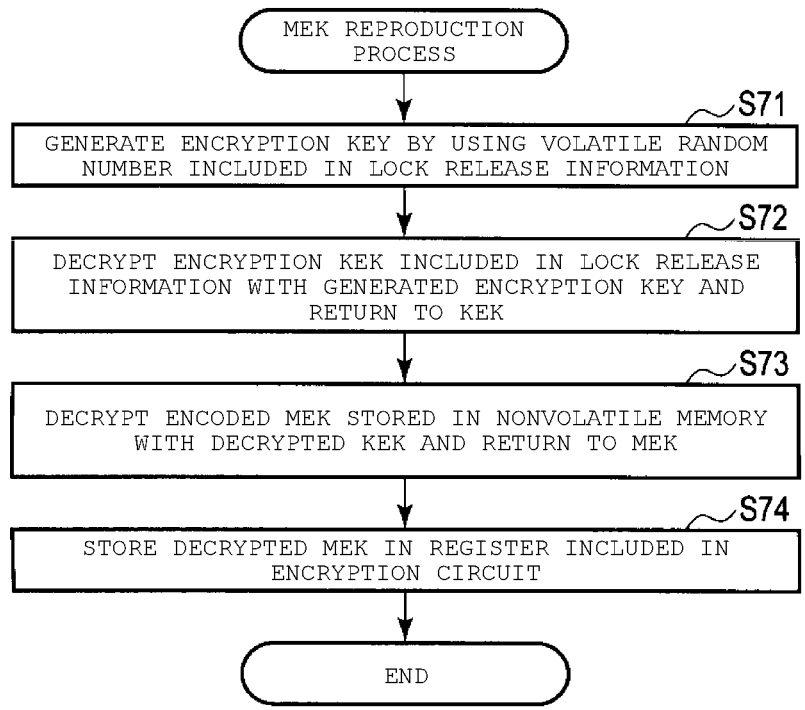
FIG. 13 is a flowchart of a MEK reproduction process performed by the memory system.

FIG. 13 is a flowchart of the MEK reproduction process performed by the memory system according to the embodiment. For example, the MEK reproduction process may be performed as the CPU 12 configured to perform a group of commands included in the main FW 34.

The CPU 12 generates an encryption key by using the volatile random number 511 included in the lock release information 51 (S71). The encryption key is obtained by, for example, an XOR operation between the volatile random number 511 and the e-Fuse Key 22A. The CPU 12 decrypts the encrypted KEK 513 included in the lock release information 51 with the generated encryption key and acquires the KEK (S72).

The CPU 12 decrypts the encrypted MEK stored in the system area 32 of the nonvolatile memory 5 with the decrypted KEK and acquires the MEK (S73). Then, the CPU 12 stores the decrypted MEK in a register in the encryption circuit 14 (S74). After S74, the CPU 12 ends the process of FIG. 13.

Through the process of FIG. 13, the MEK can be stored in the register in the encryption circuit 14 by using the lock release information 51 without acquiring the authentication information from the host 2. That is, the MEK in the range that is permitted to be accessed at the time of previous startup of the memory system 3 can be stored in the register in the encryption circuit 14.

The secure boot can reduce security risk caused by alteration of a program. Further, time required for starting up the memory system 3 can be shortened by using the lock release information 51.

Hereinafter, modification examples of the embodiment will be described.

First Modification Example

A memory system 3 according to a first modification example supports MBRDoneOnReset in addition to the configuration of the embodiment described above. The MBRDoneOnReset is a startup process for enabling Master Boot Record Shadowing (MBR Shadowing) due to a specific event. The memory system 3 according to the first modification example performs MBRDoneOnReset with PowerCycle to enhance security. When MBR Shadowing is enabled, OS is not executed.

However, when the information verification unit 411 determines that the effective lock release information 51 is stored in the PLP-protected RAM 21-2, the memory system 3 according to the first modification example does not perform MBRDoneOnReset.

Second Modification Example

In a memory system 3 according to a second modification example, in addition to the configuration of the embodiment as described above, when power supply from an external power supply to the memory system 3 is interrupted, the power storage device 6 supplies the stored power not only to the PLP-protected RAM 21-2 but also to a component that needs to perform the Known Answer Test (KAT) at the time of startup. A component that needs to perform the KAT is, for example, the encryption circuit 14.

When the information verification unit 411 determines that the effective lock release information 51 is stored in the PLP-protected RAM 21-2, the memory system 3 according to the second modification example uses the encryption circuit 14 supplied with power from the power storage device 6 without performing the KAT.

With such a configuration, the memory system 3 according to the second modification example can shorten the time until the encryption circuit 14 can be used after the secure boot, compared to a case where no power is supplied from the power storage device 6 to the encryption circuit 14.

Third Modification Example

In a memory system 3 according to a third modification example, in addition to the configuration of the embodiment described above, a function of permitting an access to the nonvolatile memory 5 by using the lock release information 51 is controlled by a user having a specific authority. For example, the controller 4 controls whether or not to permit an access to a range by using the lock release information 51 according to a request from the user having the specific authority.

The locking table 61 is expanded for this control. More specifically, an item of a Boolean type "PLPSecureBoot" is added to each entry of the locking table 61.

FIG. 14 illustrates the expanded locking table 61 according to the third modification example. "PLPSecureBoot" is added to the locking table 61. "PLPSecureBoot" indicates whether or not to permit an access to the corresponding range by using the lock release information 51.

When FALSE is set in "PLPSecureBoot", an operation of permitting an access to a corresponding range by using the lock release information 51 is disabled. Thus, LockOnReset is performed in the same manner as in a normal secure boot, and an access to the corresponding range is prohibited.

On the contrary, when TRUE is set in "PLPSecureBoot", the operation of permitting the access to the corresponding range by using the lock release information 51 is enabled.

A user having a specific authority for being capable of setting or changing a value of PLPSecureBoot is, for example, Locking SP Admins defined in a TCG standard.

In the locking table 61 illustrated in FIG. 14, FALSE is set in "PLPSecureBoot" in an entry of GlobalRange. This indicates that an access to a global range is not permitted by using the lock release information 51.

Further, TRUE is set to "PLPSecureBoot" in each entry of Range1, Range2, and Range3. This indicates that an access to Range1, Range2, and Range3 is permitted by using the lock release information 51.

As described above, according to the embodiments described above, time required for startup including secure boot can be shortened. When the power supplying from an external power supply to the memory system 3 is interrupted, the power storage device 6 supplies the stored electric charges so as to operate at least the PLP-protected RAM 21-2. When power is supplied, the controller 4 performs security verification on a program (for example, the boot loader 33, the main FW 34, etc.) stored in the nonvolatile memory 5, and when validity is proved as a result of the security verification, the controller 4 executes this program. Then, when the effective lock release information 51 is stored in the PLP-protected RAM 21-2, the controller 4 permits an access to the nonvolatile memory 5 by using the lock release information 51.

Thereby, the power supplying from the external power supply to the memory system 3 is interrupted and the secure boot is performed according to restart, and thus, alteration of program such as the boot loader 33 and the main FW 34 may be detected by the secure boot. If the effective lock release information 51 is stored in the PLP-protected RAM 21-2, the access to the nonvolatile memory 5 is permitted by using the lock release information 51. Thus, when the secure boot is performed, a user can access the nonvolatile memory 5 without inputting authentication information such as a password (or without the host 2 storing the authentication information).

Each of the various functions described in the present embodiment may be implemented by a circuit. An example of the process circuit includes a programmed processor, such as a central process unit (CPU). The processor performs described each function by executing a computer program or a group of commands stored in a memory. The processor may be a microprocessor that includes an electrical circuit. An example of the circuit also includes a digital signal processor (DSP), an application specific integrated circuit (ASIC), a microcontroller, a controller, and other electrical circuit components. Each of the components other than the CPU described in the present embodiment may also be implemented by a process circuit.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A memory system capable of communicating with a host, comprising:

a nonvolatile memory including a plurality of predetermined user areas;

a volatile memory;

a battery capable of supplying power to the memory system when power supply from an external power source is interrupted; and a controller configured to when the volatile memory maintains first information indicating that an access to at least one of the user areas is permitted and a verification value for validating the first information upon startup of the memory system, determine whether or not the first information is validated by the verification value, and upon determining that the first information is validated, permit an access from the host to said at least one of the user areas and prohibit the access to any user area other than said at least one of the user areas, and when the volatile memory does not maintain the first information and the verification value, or the volatile memory maintains the first information and the verification value but the first information is not validated, prohibit an access from the host to any user area, and thereafter, upon receipt of a command to request for an access to a user area and valid authentication information from the host, permit the access to the user area, generate first information indicating that the access to the user area is permitted and a verification value for validating the generated first information, and store the generated first information and verification value in the volatile memory.

2. The memory system according to claim 1, further comprising:
an encryption circuit including a register, wherein
the controller is configured to, when the volatile memory maintains the first information and the verification value and the first information is validated, after permitting the access to said at least one of the user areas, acquire a first encryption key to access said at least one of the user areas, and store the acquired first encryption key in the register.

3. The memory system according to claim 2, wherein
the controller is configured to, when the volatile memory does not maintain the first information and the verification value, or the volatile memory maintains the first information and the verification value but the first information is not validated, after permitting the access to the user area, acquire a first encryption key to access the user area, and store the acquired first encryption key in the register.

4. The memory system according to claim 3, wherein
the nonvolatile memory includes a system area that stores an encrypted first encryption key to access each user area, and
the controller is configured to acquire the first encryption key to access said at least one of the user areas or the user area requested by the command the user area by decrypting a corresponding encrypted first encryption key.

5. The memory system according to claim 4, wherein
the first information includes a random number and an encrypted second encryption key, and
when the volatile memory maintains the first information and the verification value and the first information is validated, the first encryption key is acquired by
generating a third encryption key using the random number,
decrypting the encrypted second encryption key with the third encryption key, and
decrypting the corresponding encrypted first encryption key stored in the system area with the second encryption key.

6. The memory system according to claim 4, wherein
when the volatile memory does not maintain the first information and the verification value, or the volatile memory maintains the first information and the verification value but the first information is not validated, the first information is generated by
generating a second encryption key from the authentication information received from the host,
generating a third encryption key by using a random number,
encrypting the second encryption key with the third encryption key, and
generating the first information indicating that the access to the user area requested by the command is permitted and including the random number and the encrypted second encryption key.

7. The memory system according to claim 2, wherein
the encryption circuit is configured to encrypt data to be written to the user area with the first encryption key, and decrypt data read from the user area with the first encryption key.

8. The memory system according to claim 1, wherein
the controller is further configured to
validate a startup program when the memory system is powered on or restarted, and
when the startup program is validated, execute the startup program and determine whether or not the volatile memory maintains the first information and the verification value.

9. The memory system according to claim 1, wherein
the user area is specified by a logical address of the non-volatile memory.

10. The memory system according to claim 9, wherein
the nonvolatile memory includes a system area that stores a table that associates each of the user areas with a logical address of the non-volatile memory.

11. A method for booting a memory system configured to communicate with a host and having a nonvolatile memory, a volatile memory, and a battery, the method comprising:
upon startup of the memory system, determining whether or not first information indicating that an access to at least one of user areas in the nonvolatile memory is permitted and a verification value for validating the first information are maintained in the volatile memory;
when the first information and the verification value are maintained in the volatile memory,
determining whether or not the first information is validated by the verification value, and
upon determining that the first information is validated, permitting an access from the host to said at least one of the user areas and prohibiting the access to any user area other than said at least one of the user areas; and
when the first information and the verification value are not maintained in the volatile memory, or the first information and the verification value are maintained but the first information is not validated,
prohibiting an access from the host to any user area, and
thereafter, upon receipt of a command to request for an access to a user area and valid authentication information, permitting the access to the user area, generating first information indicating that the access to the user area is permitted and a verification value for validating the generated first information, and storing the generated first information and verification value in the volatile memory.

12. The method according to claim 11, further comprising:
when the first information and the verification value are maintained in the volatile memory and the first information is validated, after permitting the access to said at least one of the user areas, acquiring a first encryption key to access said at least one of the user areas, and storing the acquired first encryption key in a register of an encryption circuit of the memory system.

13. The method according to claim 12, further comprising:
when the first information and the verification value are not maintained, or the first information and the verification value are maintained but the first information is not validated, after permitting the access to the user area, acquiring a first encryption key to assess the user area, and storing the acquired first encryption key in the register.

14. The method according to claim 13, wherein
the nonvolatile memory includes a system area that stores an encrypted first encryption key to access each user area, and
the method further comprises acquiring the first encryption key to access said at least one of the user areas or the user area specified by the command by decrypting a corresponding encrypted first encryption key.

15. The method according to claim 14, wherein
the first information includes a random number and an encrypted second encryption key, and
when the volatile memory maintains the first information and the verification value and the first information is validated, the first encryption key is acquired by
generating a third encryption key using the random number,
decrypting the encrypted second encryption key with the third encryption key, and
decrypting the corresponding encrypted first encryption key stored in the system area with the second encryption key.

16. The method according to claim 14, wherein
when the volatile memory does not maintain the first information and the verification value, or the volatile memory maintains the first information and the verification value but the first information is not validated, the first information is generated by
generating a second encryption key from the authentication information received from the host,
generating a third encryption key by using a random number,
encrypting the second encryption key with the third encryption key, and
generating the first information indicating that the access to the user area is permitted and including the random number and the encrypted second encryption key.

17. The method according to claim 12, wherein
data to be written to the user area is encrypted by the encryption circuit using the first encryption key, and
data read from the user area is decrypted using the first encryption key.

18. The method according to claim 11, further comprising:
validating a startup program when the memory system is powered on or restarted, and
when the startup program is validated, executing the startup program and proceeding to the determination of whether or not the first information and the verification value are maintained in the volatile memory.

19. The method according to claim 11, wherein
the user area is specified by a logical address.

20. The method according to claim 19, wherein
the nonvolatile memory includes a system area that stores a table that associates each of the user areas with a logical address of the non-volatile memory.

* * * * *